United States Patent
Blondeel et al.

(10) Patent No.: US 8,006,584 B2
(45) Date of Patent: Aug. 30, 2011

(54) SHIFTER ASSEMBLY INCLUDING BEZEL LOCK AND RELEASE MECHANISM

(75) Inventors: Chad A. Blondeel, Newaygo, MI (US);
 Norman D. Rezmer, Hampshire, IL (US); Scott B. Fugate, Linden, MI (US)

(73) Assignee: Dura Global Technologies, LLC, Rochester Hills, MI (US)

( * ) Notice: Subject to any disclaimer, the term of this patent is extended or adjusted under 35 U.S.C. 154(b) by 372 days.

(21) Appl. No.: 11/418,434

(22) Filed: May 4, 2006

(65) Prior Publication Data

US 2006/0243083 A1     Nov. 2, 2006

Related U.S. Application Data

(63) Continuation of application No. 11/115,831, filed on Apr. 27, 2005, now abandoned.

(51) Int. Cl.
 *B60K 20/00* (2006.01)
 *G05G 1/00* (2008.04)
(52) U.S. Cl. .......................................... 74/473.1; 74/575
(58) Field of Classification Search ............... 74/473.1, 74/473.18, 473.19, 473.21, 473.3, 473.33, 74/473.36, 471 XY, 575, 576, 577 R, 577 S, 578; 116/28.1, DIG. 20; D12/179; 180/346, 90.6
See application file for complete search history.

(56) References Cited

U.S. PATENT DOCUMENTS

| | | | | | |
|---|---|---|---|---|---|
| 4,446,809 | A | * | 5/1984 | Dennis | 116/28.1 |
| 5,339,501 | A | * | 8/1994 | Gugle et al. | 24/581.1 |
| 5,531,496 | A | * | 7/1996 | Zbinden et al. | 296/96.21 |
| 5,623,124 | A | * | 4/1997 | Chien | 174/53 |
| 5,626,093 | A | * | 5/1997 | Jacobs et al. | 116/28.1 |
| 5,848,855 | A | * | 12/1998 | Roossien | 403/329 |
| 5,862,708 | A | * | 1/1999 | Shamoto | 74/473.18 |
| 6,318,925 | B1 | * | 11/2001 | Bowers et al. | 403/325 |

* cited by examiner

*Primary Examiner* — Thomas R Hannon
*Assistant Examiner* — Alan Waits
(74) *Attorney, Agent, or Firm* — Gifford, Krass, Sprinkle, Anderson & Citkowski, P.C.; Kevin S. McKenzie; Dean B. Watson

(57) ABSTRACT

A shifter assembly includes a base. A light box is disposed about the base. The shifter assembly also includes a ratchet system for adjusting the light box relative to the base.

22 Claims, 6 Drawing Sheets

SHIFTER ASSEMBLY INCLUDING BEZEL LOCK AND RELEASE MECHANISM

RELATED APPLICATION

This application is a continuation of U.S. patent application Ser. No. 11/115,831 filed Apr. 27, 2005, which is incorporated herein by reference.

FIELD OF THE INVENTION

The invention relates to a shifter assembly and more particularly to a shifter assembly having an adjustable bezel.

BACKGROUND OF THE INVENTION

Shifter assemblies are utilized in automotive applications for changing between various positions of a transmission. Shifters generally include a base attached to a floor of a vehicle. The base accommodates a shift lever to facilitate movement between various engagement positions associated with a transmission. The base accommodates a bezel or trim assembly covering the mechanical linkages associated with the base and to provide an aesthetic appearance to a shifter assembly.

Typically, a console or other such trim assembly surrounds the shifter and incorporates it. In such an arrangement, the shifter assembly is attached to the floor of a vehicle and then the console is positioned about the shifter assembly. Typically, such consoles have tolerances and size variations that require adjustment of the bezel to mate with the console such that visible gaps are not present providing an aesthetically pleasing appearance to the shifter and console.

There is therefore a need in the art for an adjustable shifter having a bezel that can be installed in a vehicle with the bezel locked in an installation position, and then released to mate with a console. There is also a need in the art for a shifter and bezel that is rigid in relation to the console after it has been released such that an operator of a vehicle will not be able to return the bezel to the installation position.

SUMMARY OF THE INVENTION

A shifter assembly includes a base. A light box is disposed about the base. The shifter assembly also includes a ratchet system for adjusting the light box relative to the base.

DETAILED DESCRIPTION OF THE PREFERRED EMBODIMENTS

Figure 1:
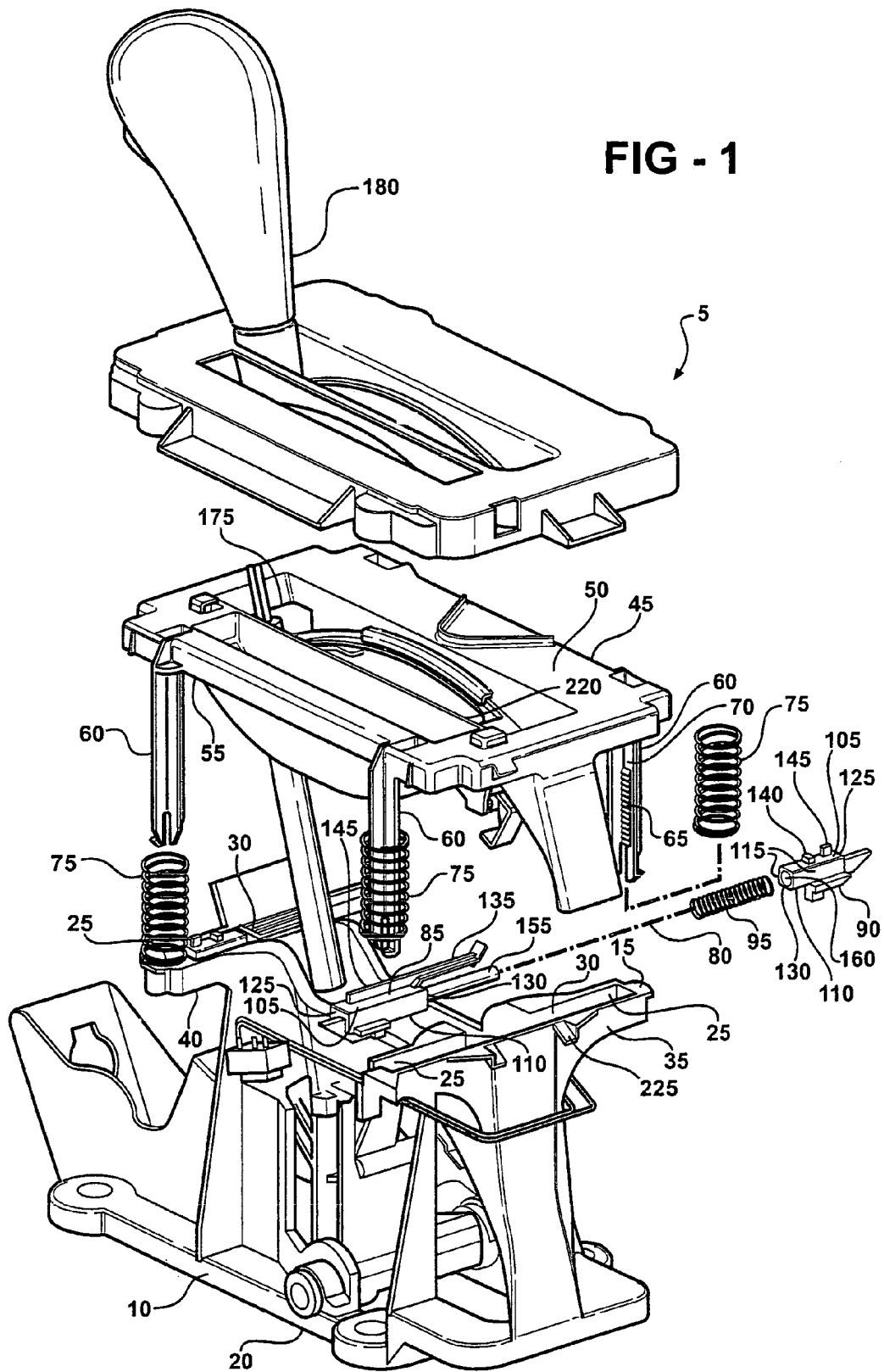
FIG. 1 is a perspective view of a shifter assembly according to a preferred embodiment of the present invention.

Referring to FIG. 1, there is shown a preferred embodiment of a shifter assembly 5 according to the invention. The shifter assembly 5 includes a base 10 having top and bottom surfaces 15, 20. The bottom surface 20 is preferably attached to a floor of a vehicle (not shown). The base 10 includes leg slots 25 formed through the top surface 15 and at least one channel 30 formed on the top surface 15. In the preferred embodiment depicted in FIG. 1, two channels 30 are formed on the top surface 15 at a front and rear portion 35, 40 of the base 10.

A light box 45 having top and bottom surfaces 50, 55 is disposed about the base 10. The light box 45 includes downwardly extending legs 60 that are received in the leg slots 25 formed through the top surface 15 of the base 10. The downwardly extending legs 60 preferably include ratchet teeth 65 formed thereon. The ratchet teeth 65 are preferably formed on an inside surface 70 of the legs 60 in relation to the base 10.

A plurality of springs 75 are disposed about the legs 60 and engage the top surface 15 of the base 10 and the bottom surface 55 of the light box 45 for biasing the light box 45 from the base 10.

At least one pair of bezel locks 80 is received in the channel 30 formed on the top surface 15 of the base 10. The bezel locks 80 are adapted to engage the ratchet teeth 65 formed on the legs 60 such that the light box 45 can be adjusted in a single direction from a starting position to a final position.

Figure 2:
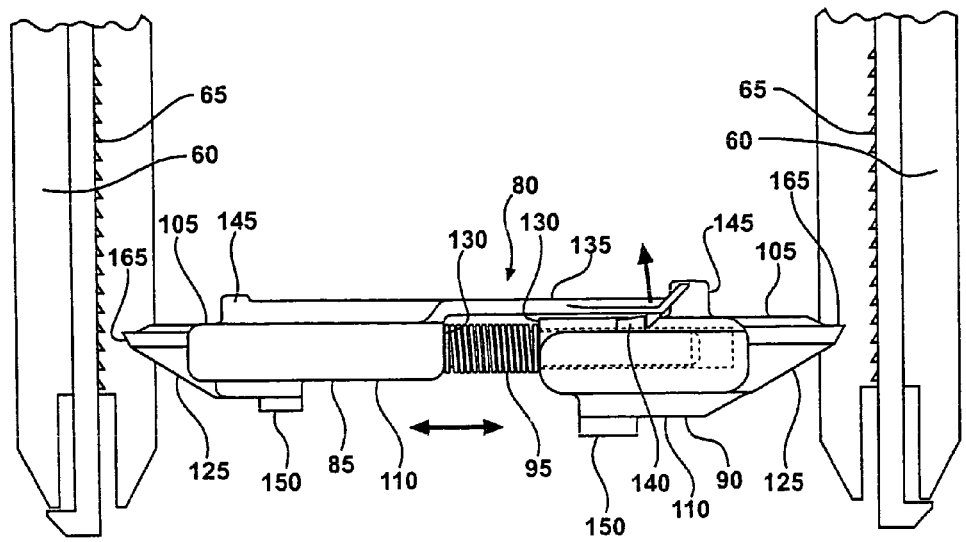
FIG. 2 is a partial sectional view detailing the bezel locks in an initial position prior to release of the bezel locks.
Figure 3:
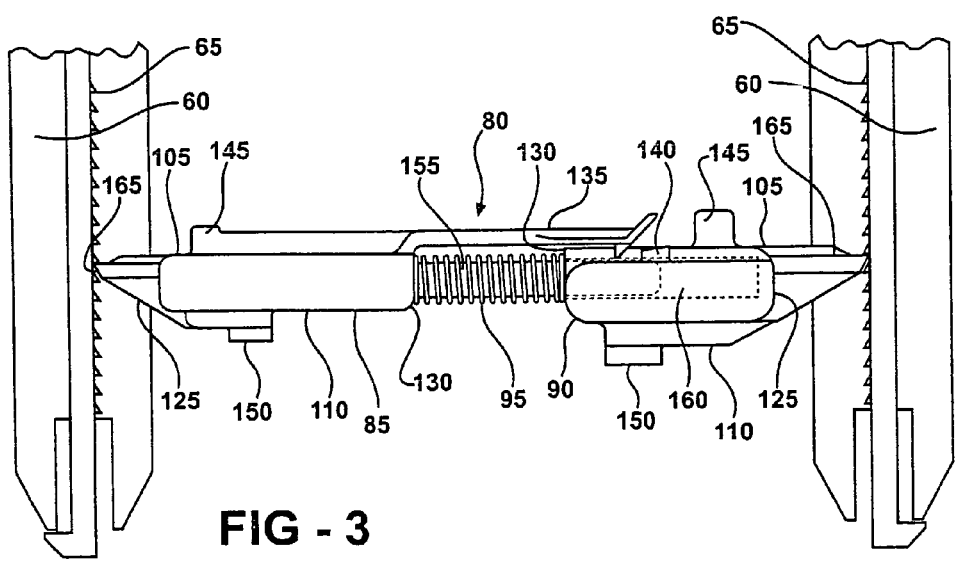
FIG. 3 is a partial sectional view detailing the bezel locks after release and engaging the ratchet teeth formed on the downwardly extending legs of the light box.
Figure 5:
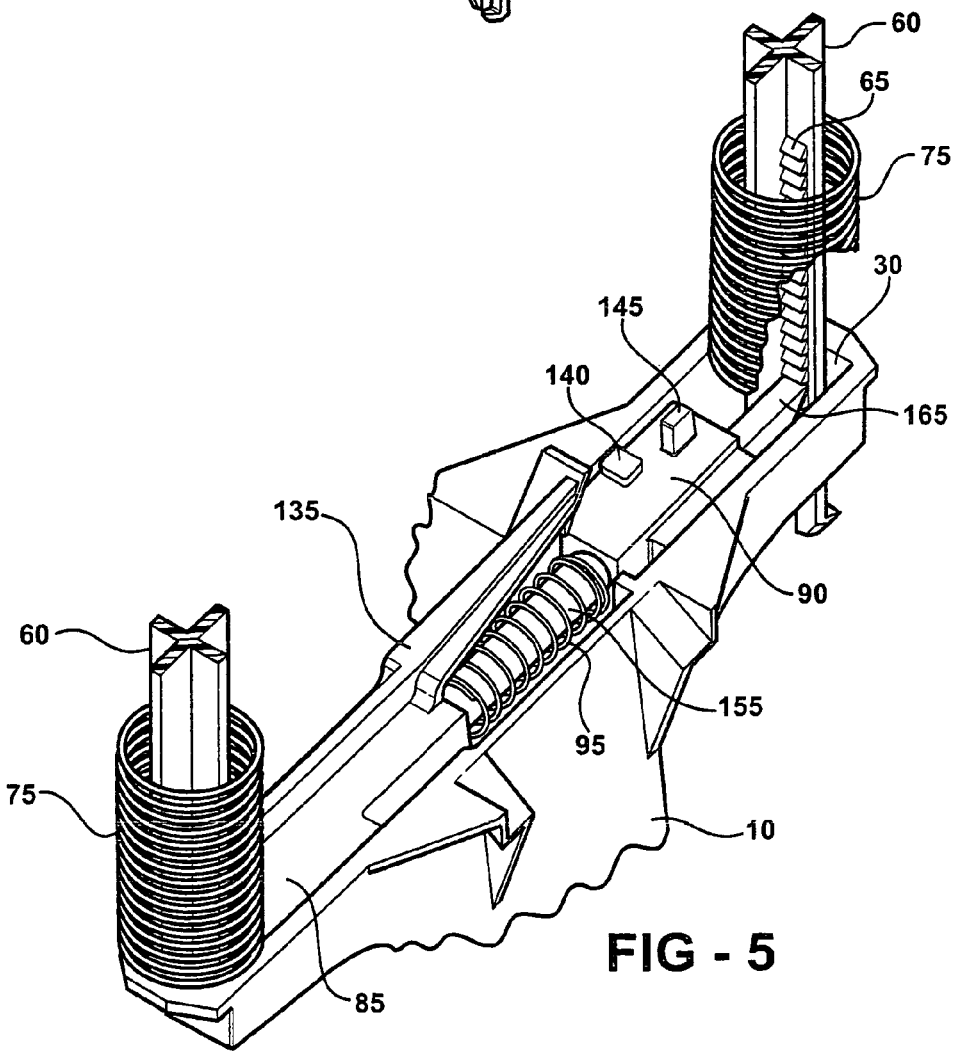
FIG. 5 is a partial perspective view detailing the bezel locks positioned in a channel formed on the top surface of the base and in the release position such that the bezel locks engage the ratchet teeth formed on the downwardly extending legs of the light box.

As stated above, the base 10 preferably includes two channels 30 formed on the top surface 15. Similarly, in a preferred aspect two pairs of bezel locks 80 are disposed in the channels 30 formed on the top surface 15 of the base 10. Each pair of bezel locks 80 preferably includes a female lock member 90 spaced from a male lock member 85 by a biasing spring 95. The male and female lock members 85, 90 include locking features 140 for releasably coupling the male and female lock members 85, 90 from an initial position to a release position. The male and female lock members 85, 90 include top and bottom surfaces 105, 110, opposing sides 115, and opposing first and second ends 125, 130. As best shown in FIGS. 2, 3 and 5, the top surface 105 of the male lock member 85 includes a laterally extending leg 135. The laterally extending leg 135 is preferably integrally formed with the top surface 105 and extends upward and lateral with respect to the top surface 105. The top surface 105 of the female lock member 90 includes a raised tab 140 for mating with the laterally extending leg 135 of the male lock member 85 defining the locking feature between the male and female lock members 85, 90. The top surfaces 105 of both the male and female lock members 85, 90 include raised ribs 145 formed thereon for assembling the male and female lock members 85, 90 against the force of the biasing spring 95. Additionally, the raised ribs 145 may be utilized for verifying in the assembly of the invention to verify that the male and female lock members 85, 90 are fully extended prior to shipping of the shifter assembly 5. The raised ribs 145 allow the male and female lock members 85, 90 to be pushed together such that the laterally extending leg 135 of the male member 85 can engage the raised tab 140 of the female lock member 90 coupling the male and female lock members 85, 90 against the force of the biasing spring 95.

The bottom surfaces 110 of the male and female lock members 85, 90 include location tabs 150 formed thereon for mating with a corresponding feature formed in the channel 30 formed on the top surface 15 of the base 10. The location tabs 150 guide the male and female lock members 85, 90 when positioned in the channel 30 assuring stable movement when the lock members are released from the initial position to the release position. In addition, the location tabs 150 ensure that the upward movement of the light box legs 60 does not pull the male and female lock members 85, 90 out of the channels 30 formed in the base 10.

The male lock member 85 preferably includes a laterally extending projection 155 formed on its second end 130. The projection 155 is received within a cavity 160 formed in the second end 130 of the female lock member 90. In a preferred aspect, the biasing spring 95 is disposed about the laterally extending projection 155 of the male lock member 85 and abuts the second ends 130 of the male and female lock members 85, 90 when they are in the initial position, as best shown in FIG. 2. The first ends 125 of the male and female lock members 85, 90 both preferably include engagement teeth 165 formed thereon for mating with the ratchet teeth 65 formed on the downwardly extending legs 60 of the light box 45 when the male and female lock members 85, 90 are in the release position, as best seen in FIG. 3.

When the male and female lock members 85, 90 are assembled, the biasing spring 95 is disposed about the projection 155 of the male member 85 and is inserted into the cavity 160 of the female lock member 90. The lock members are then pushed together against the biasing force of the spring 95 such that the laterally extending leg 135 of the male lock member 85 engages the tab 140 of the female lock member 90 in the initial position, shown in FIG. 2. The male and female lock members 85, 90 can then be moved to the release position, shown in FIG. 3, by manipulating the laterally extending leg 135 upward, shown by the arrow in FIG. 2, allowing for the biasing force of the spring 95 to push the male and female lock members 85, 90 apart such that the engagement teeth 165 on the first ends 125 of the male and female lock members 85, 90 engage the ratchet teeth 65 formed on the downwardly extending legs 60 of the light box 45. In this manner, movement of the light box 45 relative to the base 10 is allowed in a single direction, as will be discussed in more detail below.

Figure 4:
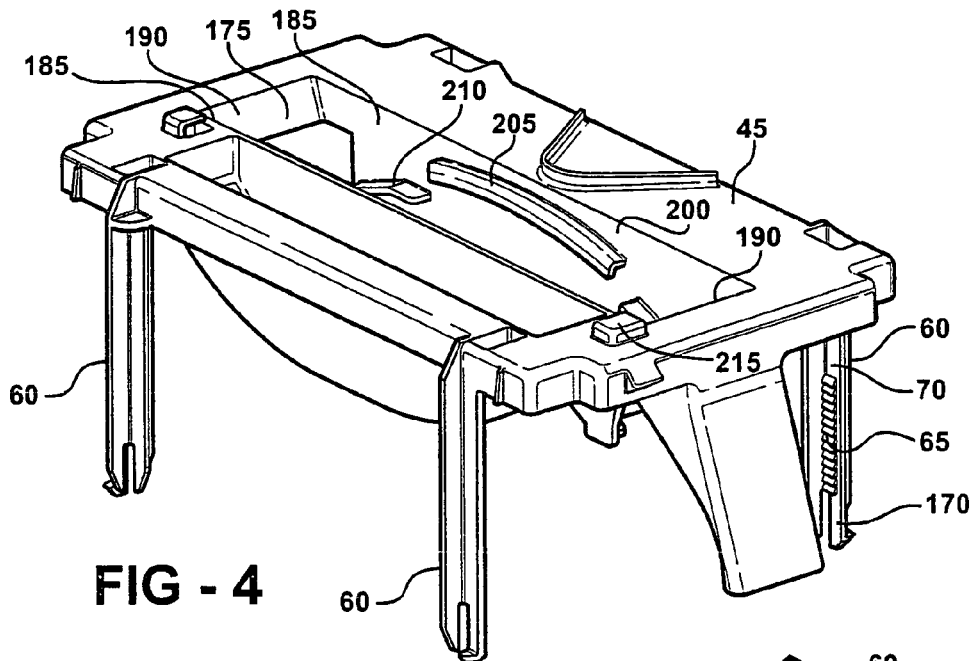
FIG. 4 is a perspective view detailing the light box according to a preferred embodiment of the present invention.

Referring to FIG. 4, there is shown the light box 45 of the shifter assembly 5 of the present invention. As stated above, the light box 45 is preferably positioned about the base 10 such that the downwardly extending legs 60 of the light box 45 are received in slots 25 formed in the base 10. The downwardly extending legs 60 preferably include ratchet teeth 65 formed on an inside surface 70, relative to the base 10 for engaging the engagement teeth 165 of the male and female lock members 85, 90, as described above. The ratchet teeth 65 and engagement teeth 165 are designed such that a one-way ratcheting action is defined allowing the light box 45 to spring upward relative to the base 10 while preventing downward movement of the light box 45 relative to the base 10. In a preferred aspect, the downwardly extending legs 60 also include tangs 170 formed at the ends for holding the downwardly extending legs 60 within the slots 25 formed in the base 10. The tangs 170 act as a stop, limiting the amount of travel of the light box 45 against the force of the plurality of springs 75 disposed about the downwardly extending legs 60.

The light box 45 includes a guide channel 175 formed through the top surface 50 allowing for movement of a shift lever 180 to various positions for manipulating a transmission of a vehicle. The guide channel 175 is defined by opposing sidewalls 185, and opposing end walls 190. The opposing sidewalls 185 of the guide channel 175 preferably include a travel guide 200 formed thereon. The travel guide 200 is defined by a top L-shaped extension 205 and spaced forward and rearward bottom ramp extensions 210, 215. The travel guide 200 preferably receives a release member 220 for initiating movement of the light box 45 from the starting position to the final position.

Figure 6:
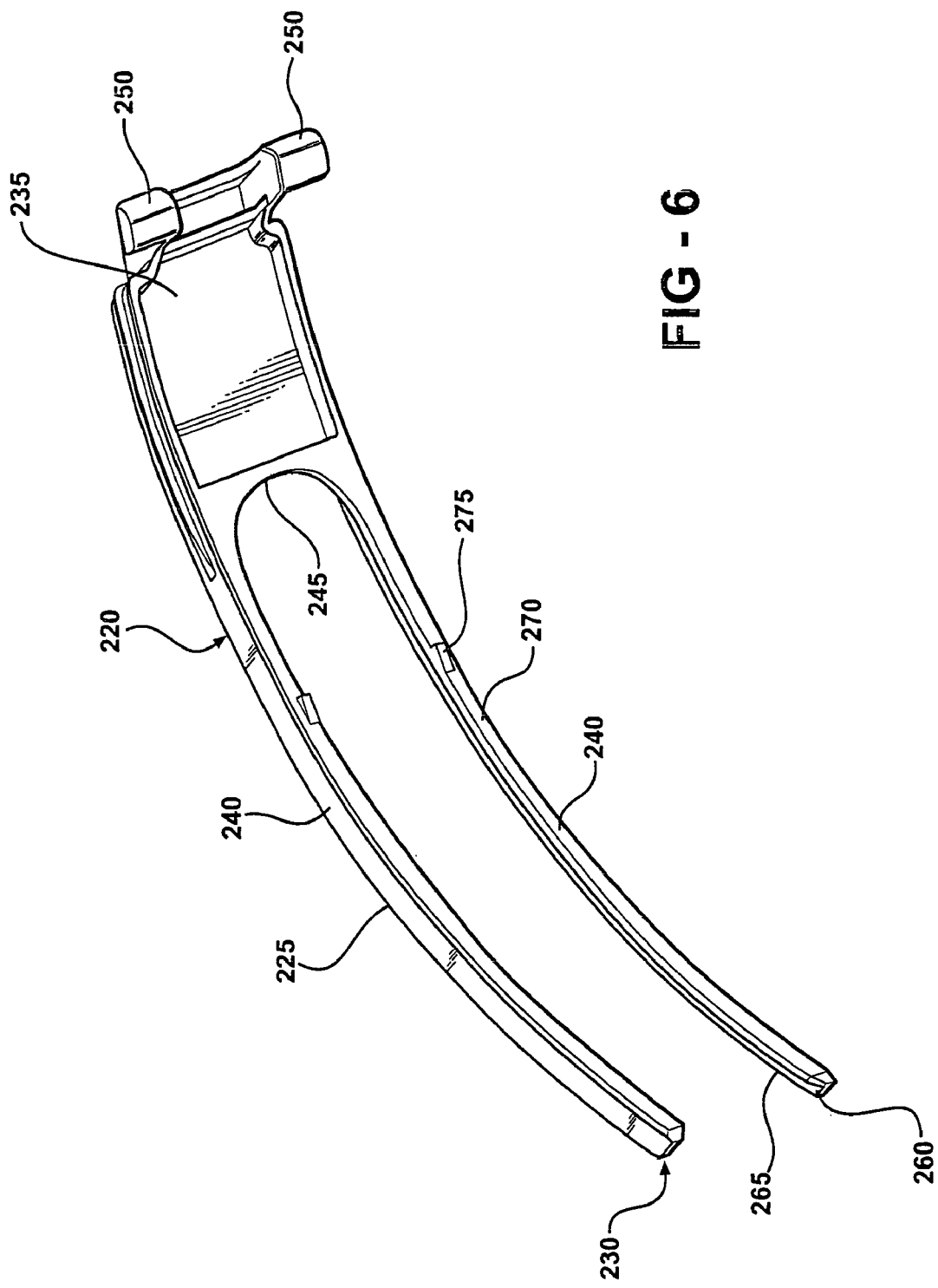
FIG. 6 is a perspective view of a release pin received in the light box for facilitating release of the light box from a starting position to a final position.

Referring to FIG. 6, there is detailed a release member 220 having an arcuate body 225 having proximal and distal ends 230, 235. The distal end 235 preferably includes extending proximately therefrom two spaced legs 240 separated from each other by an engagement slot 245. The distal end 235 of the release member 220 also includes hook projections 250 extending downward for releasably engaging corresponding projections 255 formed on the base 10, as best seen in FIG. 1. In addition, the proximal end 230 of the release member 220 may include an angled portion that is received in a ledge 231 formed on the front of the base 10. The ledge 231, similar to the projection 255, prevents upward movement of the light box 45 until the release member 220 has been moved, as will be discussed in more detail below. The hook projections 250 of the release member 220 engage the projections 255 formed on the base 10 in the starting position and are disengaged from the base 10 in the final position, as will be discussed in more detail below. The two spaced legs 240 of the release member 220 preferably include a top surface 260 having a raised ridge 265 formed thereon. Additionally, the two spaced legs 220 include a bottom surface 270 having a tab 275 formed thereon. The raised ridge 265 formed on the top surface 260 of the two spaced legs 220 is received and is entrained in the L-shaped extension 205 of the light box 45. The bottom surface 270 of the release member 220 slides on the spaced forward and rearward bottom ramp extensions 210, 215 of the light box 45. In this manner, the release member 220 is guided along the travel guide 200 of the light box 45 when moved from the starting position to the final position.

Figure 7:
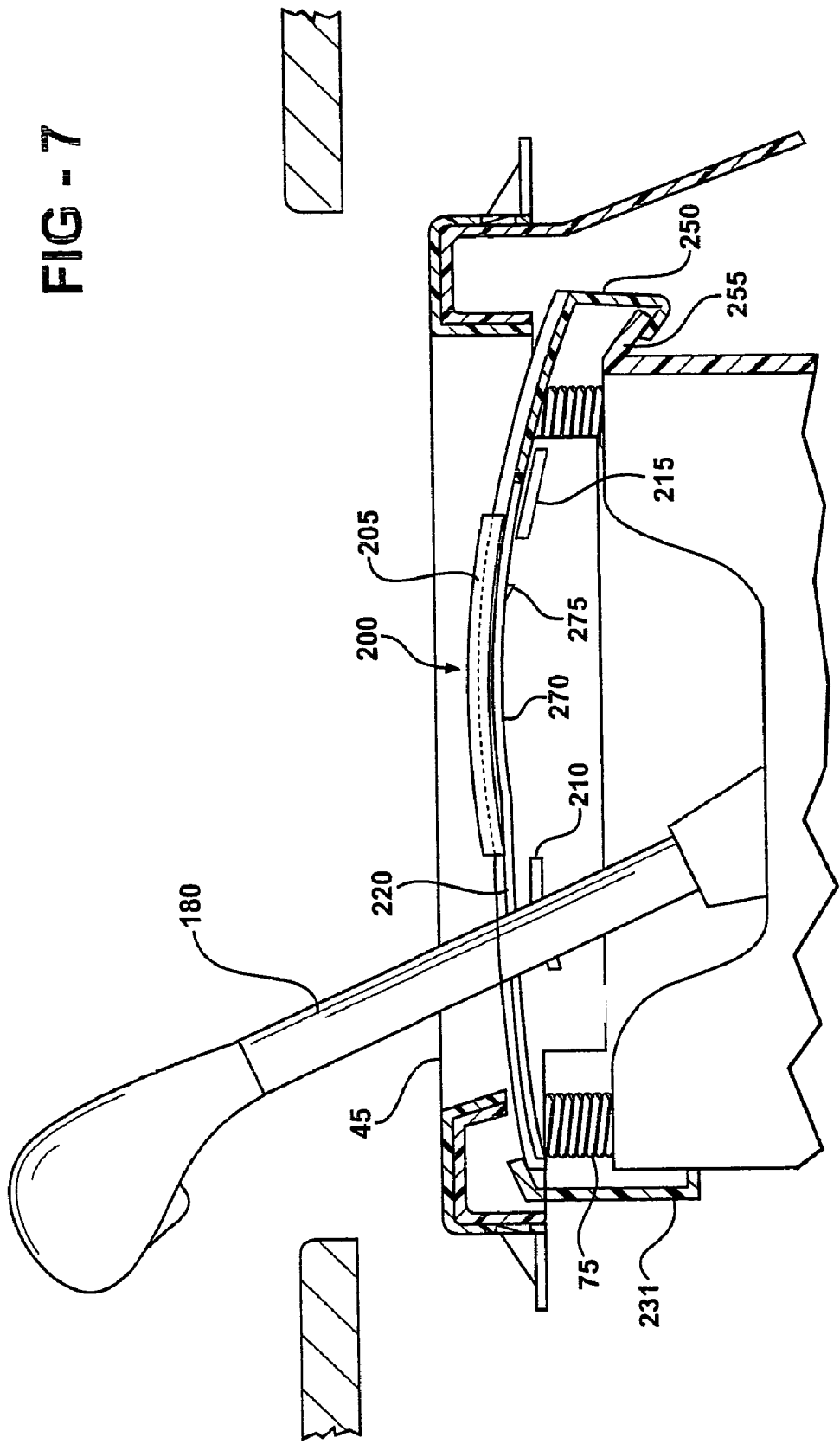
FIG. 7 is a partial sectional view detailing the release member in a starting position.
Figure 8:
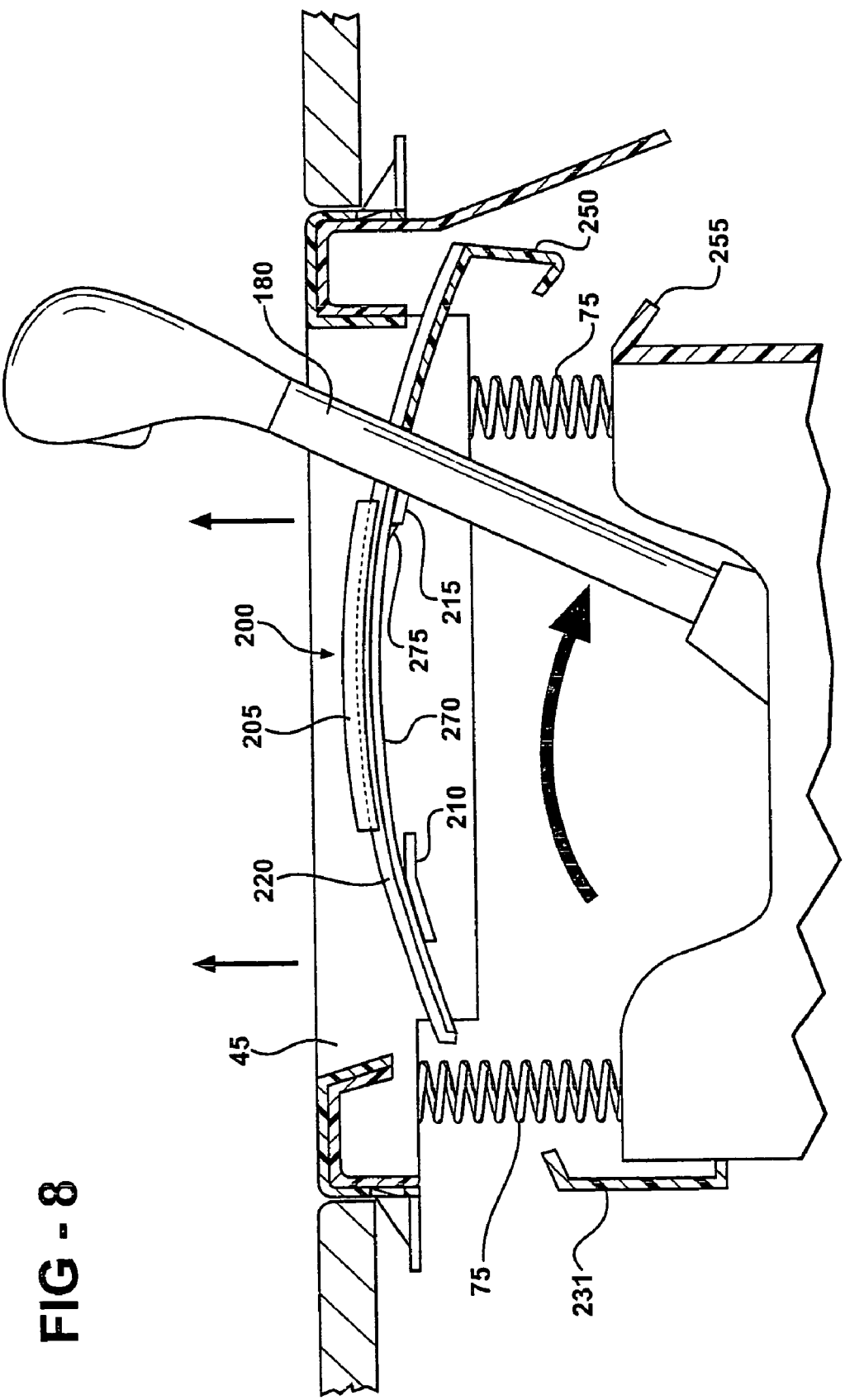
FIG. 8 is a partial sectional view detailing the release member in a final position.

As best shown in FIGS. 7 and 8, the release member 220 is positioned within the travel guide 200 defined by the L-shaped extension 205 and spaced forward and rearward bottom ramp extensions 210, 215. In the starting position, the shift lever 180 is positioned forward relative to the engagement slot 245 of the release member 220. The hook projections 250 of the release member 220 are engaged with the corresponding projections 255 formed on the base 10 such that movement of the light box 45 relative to the base 10 is prevented. As the shift lever 180 is moved downward, it contacts the engagement slot 245 of the release member 220 moving the hook projections 250 away from engagement with the corresponding projections 255 formed on the base 10. This allows the plurality of springs 75 disposed about the downwardly extending legs 60 of the light box 45 to bias the light box 45 from the base 10, moving the light box 45 from the starting position to the final position. The release member 220 is limited in the amount of travel within the travel guide 200 by the tab 275 formed on the bottom surface 270 of the release member 220 which engages the rearward bottom ramp extension 215 for maintaining the release member 220 within the travel guide 200 after release of the hook extensions 250 of the release member 220 from the corresponding projections 255 formed on the base 10. In this manner, the release member 220 is permanently retained within the travel guide 200, assuring no loose parts associated with the shifter mechanism that may damage or interfere with operation of the shifter assembly 5.

In use, the components of the shifter assembly 5 are assembled such that the male and female lock members 85, 90 are positioned within the channels 30 formed on the top surface 15 of the base 10. The male and female lock members 85, 90 are preferably in the initial position wherein the laterally extending leg 135 of the male lock member 85 engages the tab 140 formed on the female lock member 90 against the biasing force of the spring 95. The light box 45 is then positioned about the base 10 such that the laterally extending legs 60 are received in the slots 25 formed in the base 10. The plurality of springs 75 are preferably disposed about the legs 60 exerting a biasing force separating the light box 45 from the base 10. The release member 220 is received in the travel guide 200 such that an assembler can exert a downward force against the biasing force of the plurality of springs 75 to engage the hook projections 250 of the release member 220 with the corresponding projections 255 formed on the base 10. The shifter assembly 5 is now in the starting position. The base 10 of the shifter assembly 5 can then be installed onto a floor of a vehicle. Following installation of the shifter assembly 5 to the floor of the vehicle, an overhead console may be positioned about the shifter assembly 5, as is commonly utilized in the automotive industry. The shifter assembly 5 may then be positioned relative to the console in a final position wherein the shifter assembly 5 abuts the console for an aesthetically pleasing appearance. The shifter assembly 5 may be moved from the starting position by first releasing the male and female lock members 85, 90 from the initial position to the release position by bending the laterally extending leg 135 of the male lock member 85 from the tab 140 on the female lock member 90 allowing the biasing spring 95 to separate the male and female lock members 85, 90 and cause engagement of the engagement teeth 165 with the ratchet teeth 65 formed on the downwardly extending legs 60 of the light box 45. Next, the shift lever 180 may be moved downwardly to engage the engagement slot 245 of the release member 220 such that the hook members 250 are released from the base 10 allowing the plurality of springs 75 about the downwardly extending legs 60 to move the light box 45 up relative to the base 10. The engagement teeth 65 formed on the male and female lock members 85, 90 engage the ratchet teeth 65 on the light box 45 allowing movement upward but preventing downward movement of the light box 45 relative to the base 10. The light box 45 continues moving upward until it contacts the overhead console. The shifter assembly 5 is now in its final position.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A shifter assembly comprising:
   a base including leg slots formed through a top surface and at least one channel formed on the top surface;
   a light box disposed about the base, the light box including legs extending therefrom, the legs having ratchet teeth formed thereon, the legs received in the leg slots; and
   the light box including a ratchet system having at least one bezel lock, the bezel lock movable from an initial position out of engagement with ratchet teeth formed on the light box to a released position wherein the bezel lock engages the ratchet teeth defining a one way ratchet wherein the light box is adjusted relative to the base from a starting position to a final position.

2. The shifter assembly of claim 1 including at least one spring disposed between the base and light box for biasing the light box from the base.

3. The shifter assembly of claim 1 wherein the legs of the light box include flexible tangs formed at the ends for holding the downwardly extending legs within the leg slots formed in the base.

4. The shifter assembly of claim 1 wherein the at least one bezel lock includes at least one pair of bezel locks received in at least one channel formed on the top surface of the base, the bezel locks adapted to engage the ratchet teeth formed on the legs.

5. The shifter assembly of claim 4 wherein the at least one pair of bezel locks comprises a female lock member spaced from a male lock member by a biasing spring.

6. The shifter assembly of claim 5 wherein the male and female lock members include locking features for releasably coupling the male and female lock members.

7. The shifter assembly of claim 6 wherein the male lock member includes a laterally extending projection formed on the second end.

8. The shifter assembly of claim 7 wherein the female lock member includes a cavity formed in the second end for receiving the laterally extending projection of the male lock member.

9. The shifter assembly of claim 5 wherein the male and female lock members include top and bottom surfaces, opposing sides and opposing first and second ends.

10. The shifter assembly of claim 9 wherein the top surface of the male lock member includes a laterally extending leg.

11. The shifter assembly of claim 9 wherein the top surface of the female lock member includes a raised tab for mating with the laterally extending leg of the male lock member.

12. The shifter assembly of claim 9 wherein the top surfaces of the male and female lock members include raised ribs formed thereon for assembling the male and female lock members against the force of the biasing spring.

13. The shifter assembly of claim 9 wherein the bottom surface of the male and female lock members include location tabs formed thereon for mating with a corresponding feature formed in the at least one channel formed on the top surface of the base.

14. The shifter assembly of claim 1 including a release member associated with the light box and base for initiating movement of the light box from the starting position to the final position.

15. The shifter assembly of claim 14 wherein the light box includes top and bottom surfaces and a lever slot formed through the top and bottom surfaces for receiving a shift lever and wherein the light box includes a travel guide.

16. The shifter assembly of claim 15 wherein the release member is disposed in the travel guide and releasably coupled to the base, the release member adapted to contact the shift lever to initiate movement of the light box from the starting position to the final position.

17. The shifter assembly of claim 14 wherein the release member comprises an arcuate body having proximal and distal ends, the distal end having extending proximally therefrom two spaced legs separated from each other by an engagement slot.

18. The shifter assembly of claim 17 wherein the distal end includes hook projections extending downward for releasably engaging corresponding projections formed on the base.

19. The shifter assembly of claim 17 wherein the two spaced legs include a top surface having a raised ridge formed thereon.

20. The shifter assembly of claim 19 wherein the two spaced legs include a bottom surface having a tab formed thereon.

21. The shifter assembly of claim 17 wherein the travel guide is defined by a top L-shaped extension and spaced forward and rearward bottom ramp extensions and wherein the raised ridges formed on the top surface of the release member are entrained in the L-shaped extension and the bottom surface of the release member slides on the spaced forward and rearward bottom ramp extensions.

22. The shifter assembly of claim 21 wherein the tab formed on the bottom surface of the release member engages the rearward bottom ramp extension for maintaining the release member within the travel guide.

* * * * *